Oct. 3, 1933.        S. S. OTIS        1,929,256
BUILDING MATERIAL
Filed May 16, 1931
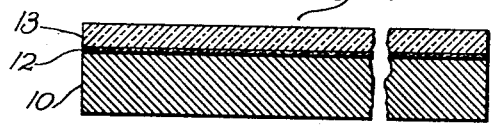
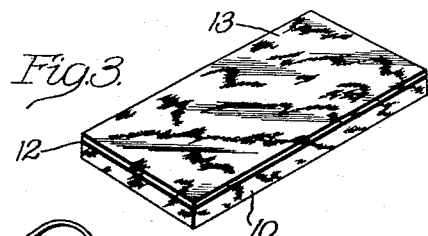
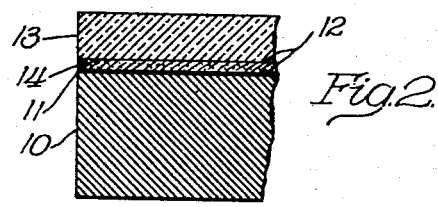
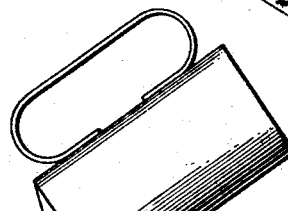
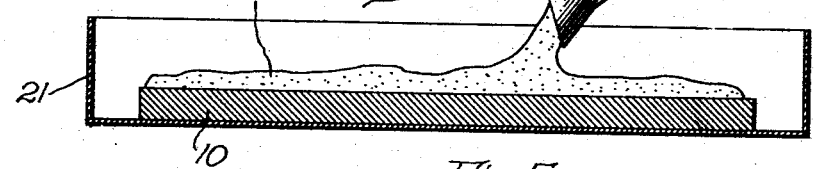
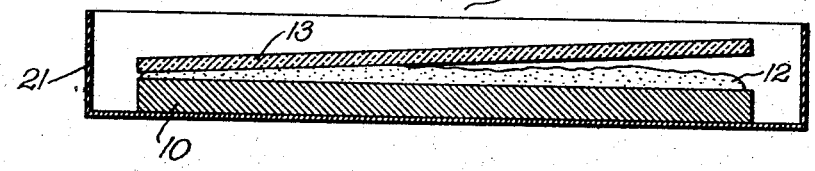
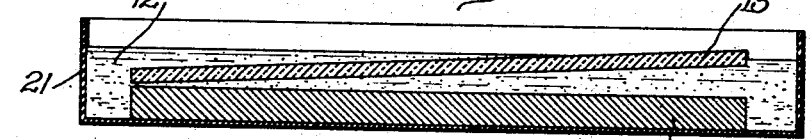
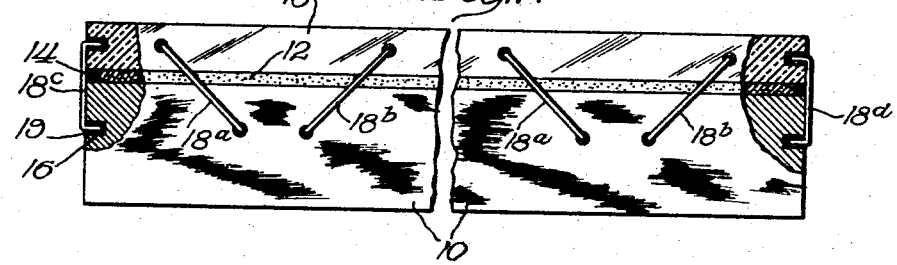
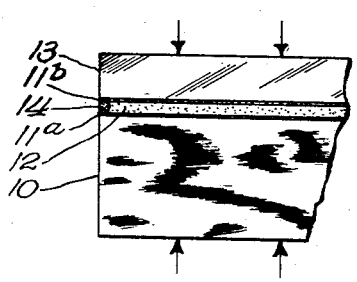
Inventor:
Samuel S. Otis
By Brown, Jackson, Boettcher & Diemer
Attys Patented Oct. 3, 1933

1,929,256

UNITED STATES PATENT OFFICE 1,929,256

BUILDING MATERIAL

Samuel S. Otis, Winnetka, Ill.

Application May 16, 1931. Serial No. 537,835

4 Claims. (Cl. 72—36)

My invention relates generally to building materials and relates more particularly to decorative building materials and protective coatings for such materials.

I have observed that decorative building materials such as marble, onyx, marble compounds such as terrazzo, art marble, and other substances similarly used for decorative purposes deteriorate rapidly when subjected to the elements and to gases and acids which come into contact with them, and by reason of mechanical wear and injury. I have conceived a means of protecting building materials of the above character indefinitely, without destroying their beauty and utility, and even enhancing their beauty and finish.

A general object of my invention is to provide a protective coating for building materials, and particularly for materials which are exposed to the elements.

More particularly it is an object of my invention to provide a protecting coating for decorative building materials which will permit their use under conditions which would previously have made such use prohibitive, to materially prolong the life of such decorative building materials by screening them from the effects of the ultra-violet rays of sunlight, to enhance their beauty, and to provide a means for strengthening them structurally.

Other and further features and objects of the invention will be more apparent to those skilled in the art upon a consideration of the accompanying drawing and following specification, wherein is disclosed several embodiments of the invention, with the understanding, however, that such changes may be made therein as fall within the scope of the appended claims without departing from the spirit of the invention.

In brief, my invention comprises applying a protective coating or glass or like transparent material to the exposed face of the ornamental building material. I may apply the protective material in any of a number of ways, as by cementing with transparent cement, and if desired, I may apply wax or other material of this nature to the face of the ornamental building material before covering it with the protective transparent sheet, in order to give the face of the building material a high polish and luster.

In said drawing:

Figure 1 is a view in section of a block of ornamental building material such as marble, to the face of which a sheet of glass has been fastened by means of a cement coating or seal;

Figure 2 is a view in section of a block of ornamental building material to which a sizing coating has been applied for the purpose of furnishing additional protection to the surface of the material, before the application of cement and glass veneer;

Figure 3 is a view in perspective of a block of ornamental building material to which a protective coating has been applied in accordance with an embodiment of my invention;

Figure 4 is a view in section illustrating a step in the process of applying a protective coating to a block of ornamental building material;

Figure 5 is a view in section illustrating another step in the process referred to in connection with Figure 4;

Figure 6 is a view in section showing an alternative method of carrying out the process of applying the protective coating to the block of ornamental building material;

Figure 7 is a view, partly in end elevation and partly in section, of a block made according to another embodiment of my invention; and Figure 8 is a view in end elevation of a block of building material to which a protective coating has been applied according to still another embodiment of my invention.

Referring now to the drawing for a more complete disclosure of this invention and particularly to Figures 1 and 2, there is shown at 10 a block of ornamental building material such as marble, onyx, marble compound such as terrazzo or art marble, or the like, to which a coating of transparent or semi-transparent cement or sealing compound 12 has been applied in a fluid state. Before the cement has dried a transparent sheet of material 13, such as glass, is applied to the face of the block against the cement and the transparent sheet is held in position until the cement has dried. The cement may be sodium silicate (water glass) or any other transparent liquid gum or glue as may best suit the purpose. The cement or seal preferably should be a material which does not contract or expand to any great extent on hardening. The cement, in most cases, will be found to not only act as a preservative for the ornamental building material, but will also give it a high luster and finish.

If desired, sizing 11 (Figure 2) may be applied to the building material 10 and allowed to dry before the cement is applied in order to prevent any chemical action between the cement and the building material. The cement coating is applied over the sizing in the same manner as it is applied directly to the building material. The sizing coating may be of any suitable material such as gum or lacquer. The gum or lacquer may be of such a character as to add luster and brilliancy to the surface of the ornamental building material. If desired, a strip of water proofing material 14 may be applied to the edge of the joint between the glass and the block in order to prevent the entrance of moisture and the like, and in order to insure permanent adhesion. All of the coating materials should be, of course, transparent, semi-transparent or translucent to permit the surface of the ornamental block to be seen after the protective coating is in place.

Another modification of the invention is illustrated in Figure 8. In this modification of the invention an acetate or cellulose film 12 is coated on both sides with layers 11a and 11b of film solvent and the sheet so coated is placed on the surface of the ornamental block 10. A sheet of glass 13 is then laid over the acetate film. Heat and pressure are applied to the underside of the block as illustrated by the arrows, and heat and pressure are also applied to the upper face of the glass sheet. After the film has dried it will be found that the glass is permanently sealed to the block.

Still another method of fastening a sheet of transparent material such as glass to an ornamental block is shown in Figure 7. In this method of fastening, the glass may be secured to the block in a manner hereinbefore described, and then in addition parallel openings 16 are drilled in the edges of the glass and the block and U-shaped ties 18 are inserted with their ends in the openings and the remaining space in the openings filled with cement 19 which is allowed to dry, thereby furnishing an additional mechanical means for holding the transparent sheet in place on the block. The openings are preferably in staggered relation so that the ties resist and prevent any movement of the block in a direction parallel to the face of the block. For instance, ties 18a and 18b will prevent any movement of the glass to the right or the left, while ties 18c and 18d will prevent movement of the glass in the other direction. Of course all of the ties are effective to prevent movement of the glass outwardly from the block.

In instances where the ties 18 are used, the coating of cement 12 on the face of the ornamental block may be omitted if desired, the seal 14 being retained to prevent the entrance of moisture between the block and glass.

It is very desirable that the transparent coating make a perfect bond with the face of the block of building material. The chief difficulty encountered is the presence of bubbles in the cement after the glass has been applied to the block. I have found several methods of applying the glass to the block which obviate these difficulties. These various methods are shown in Figures 4 to 6, inclusive. Referring particularly to Figures 4 and 5, a preferred method of applying the glass to the block is to place the block 10 in a suitable tray 21 and to spread the cement evenly over the block. As the block is in a horizontal position the cement tends to spread evenly, but irregularities of the surface of the cement may occur. If the glass were to be laid directly on the cement the irregularities of the surfaces of the cement would cause bubbles of air to be caught under the glass, which bubbles remain after hardening of the cement, thereby permitting chemical action to take place at the air spaces and spoiling the beauty of the block. I therefore prefer to lay one edge of the glass against the block and lower the whole glass hinge-like, until the glass surface is parallel to the surface of the block. In this manner air caught between the glass and the cement is permitted to escape.

In another method of attaching the glass to the surface of the block the block is placed in the bottom of a tray as shown in Figure 4, but cement is poured in the tray until the block is completely submerged. The glass is then laid upon the block, as before, except that now the glass is completely submerged in the liquid cement. The block and glass are then removed from the cement bath and the exposed surface of the glass is cleaned free of cement before the drying and setting process is completed.

When installing the finished product in a building, a further water-proofing precaution may be obtained by painting the back and sides of the block of building material, for example, with impervious material, and calking the joints with litharge.

It may readily be understood that I have provided means for protecting decorative and delicate marbles, onyxes, marble compounds, such as terrazzo or art marbles, and the like, from chemical action, weathering, erosion, and so on, and that such materials may be placed where they were heretofore omitted on account of their rapid deterioration. In addition, by covering the decorative building material with glass or other transparent coatings which have a filtering effect on light rays and which therefore partially or entirely prevent the passage of ultra-violet rays, the decorative materials will retain their colors much longer than ordinarily. I have also provided means for adding to the luster and high polish of the surface of the building material, and have provided means for retaining this finish. I have also furnished a means of structurally reenforcing and fastening the block of building material and thereby permit the use of highly fissured building material where it could not be used previously.

Building material made according to my invention may be used not only for buildings and other structures but may be used for counters, monuments, flooring and so on, and, in fact, may be used wherever ornamental material is desired which is resistant to the deteriorating effects of light, chemical action, erosion, wear and mechanical injury.

Having thus described my invention, I claim:

1. The combination of a block of ornamental building material having a polished face, a transparent glass covering said face, a hermetic seal between the edges of the block and the edges of the glass, and means engaging the edges of the block and glass for mechanically holding the glass on the block.

2. The combination of a block of ornamental building material having a polished face, a transparent glass covering said face, a hermetic seal between the edges of the block and the edges of the glass, and metallic means disposed on the edges of the block and glass and embedded in the block and glass for mechanically holding the glass on the block.

3. The combination of a block of ornamental building material having a polished face, a transparent glass covering said face, a hermetic seal between the edges of the block and the edges of the glass, and U-shaped metal staples embedded and cemented in the edges of said block and glass for mechanically holding the glass on the block.

4. The combination of a block of ornamental building material having a polished face, a transparent glass covering said face, a hermetic seal between the edges of the block and the edges of the glass, and means for mechanically holding the glass on the block.

SAMUEL S. OTIS.